United States Patent [19]

Pearce

[11] Patent Number: 5,238,193
[45] Date of Patent: Aug. 24, 1993

[54] DRY GRINDING

[75] Inventor: David A. Pearce, Bodmin, United Kingdom

[73] Assignee: ECC International Limited, United Kingdom

[21] Appl. No.: 871,922

[22] Filed: Apr. 21, 1992

[30] Foreign Application Priority Data

Apr. 23, 1991 [EP] European Pat. Off. ......... 91303639.8
Mar. 27, 1992 [GB] United Kingdom ................. 9206706

[51] Int. Cl.$^5$ .......................... B02C 2/16; B02C 18/00
[52] U.S. Cl. ........................................ 241/19; 241/47; 241/29
[58] Field of Search .................... 241/19, 47, 29, 186.2

[56] References Cited

U.S. PATENT DOCUMENTS

| 3,075,710 | 1/1963 | Feld et al. | |
|---|---|---|---|
| 3,549,091 | 12/1970 | Slepetys . | |
| 3,670,970 | 6/1972 | Szegvari | 241/27 |
| 4,225,092 | 9/1980 | Matter et al. | 241/46 |
| 4,673,134 | 6/1987 | Barthelmess | 241/57 |
| 4,964,576 | 10/1990 | Datta | 241/19 |

FOREIGN PATENT DOCUMENTS

| 238040 | 9/1987 | European Pat. Off. . |
| 728698 | 4/1955 | United Kingdom . |
| 1253067 | 11/1971 | United Kingdom . |
| 2179268 | 3/1987 | United Kingdom . |
| 2190016 | 11/1987 | United Kingdom . |

OTHER PUBLICATIONS

European Search Report.

Primary Examiner—Douglas D. Watts
Attorney, Agent, or Firm—Klauber & Jackson

[57] ABSTRACT

Apparatus for grinding particulate solid material in a substantially dry state, the apparatus comprising, means for introducing particulate solid material into a grinding chamber (4), a perforated base (8) of the grinding chamber (4) through which gas is introduced to provide an upward flow of gas passing through the particulate solid material and an impeller (42) rotating in the grinding chamber (4) to agitate the particulate solid material. The perforated base (8) has a central imperforate area (10) which causes the gas to pass preferentially through the region near the walls of the grinding chamber (4). In addition, a horizontal baffle plate (17) having a central opening (18) is positioned in the grinding chamber (4) at a height above the perforated base (8) which is not greater than one half of the transverse width of the grinding chamber (4). The horizontal baffle plate (17) is provided to prevent the bed of particulate solid material from extending upwards to an undesirable degree near the walls of the grinding chamber (4). The grinding apparatus may be used with advantage in surface treating an inorganic material.

40 Claims, 3 Drawing Sheets

DRY GRINDING

This invention concerns improved apparatus for dry grinding particulate solid material. The invention also provides a process of attrition grinding of a substantially dry particulate solid material using the improved apparatus and a process for surface treating inorganic materials, such as kaolin, calcined kaolin, talc, mica, silica, calcium carbonate, gypsum and the like, with substances which improve the compatibility of the inorganic material with, or its dispersibility in, an organic solvent or an organic polymeric material with the improved apparatus.

By "dry grinding", we mean that the grinding is conducted in the presence of no more than 10% by weight of water.

GB-A-2190016 and GB-A-2179268 disclose apparatus for grinding particulate solid material, which apparatus comprises a grinding chamber, means for introducing particulate solid material into the grinding chamber, a perforated base of the grinding chamber through which gas is introduced to provide an upward flow of gas passing through the particulate solid material and an impeller rotating in the grinding chamber to agitate the particulate solid material contained therein.

If an inorganic material, for example a ground natural mineral material, is to be used as a filler or extender in an organic medium or a polymeric material, it is often desirable to treat the surface of the inorganic material with a substance such that the inorganic material is well wetted by the organic medium or bonds well with the polymeric material. For this purpose, ground natural calcium carbonate has been treated with stearic acid, and kaolin and silica have been treated with higher alkyl (10 to 24 carbon atoms) amines or quaternary ammonium compounds or with substituted silanes, The surface treatment has, in some cases, been effected by grinding the natural mineral material with the treating agent, for example, see GB-728698, GB-1249901, GB-1253067 and US-3549091. It has, however, been discovered that the prior art processes for treating the natural mineral material with the treating agent do not, generally, give a very uniform distribution of the treating agent over the surface of the mineral material, and therefore a relatively large quantity of the treating agent is required to give a particular effect. For example, when the treated mineral material is to be used as a reinforcing filler in a rubber or plastics composition, a relatively large quantity of the treating agent must be applied to the mineral material in order to achieve the required strength properties.

According to a first aspect of the present invention, there is provided an apparatus for dry grinding particulate solid material, which apparatus comprises a grinding chamber, means for introducing particulate solid material into the grinding chamber, a perforated base of the grinding chamber through which gas is introduced to provide an upward flow of gas passing through the particulate solid material and an impeller rotating in the grinding chamber to agitate the particulate solid material contained therein, characterised in that the perforated base has a central imperforate area which causes the gas to pass preferentially through the region near the walls of the grinding chamber, and in that a horizontal baffle plate having a central opening is positioned in the grinding chamber at a height above the perforated base which is not greater than one half of the transverse width of the grinding chamber.

When the impeller rotates in the particulate solid material in the grinding chamber, there is a tendency for a vortex to form so that the height of the bed of particulate solid material is greater near the walls of the grinding chamber than in the central region. The central imperforate area of the perforated base prevents the gas from passing preferentially through the region of the bed of least height, and therefore of least resistance, and forces the gas to travel through the region of the bed near the walls of the grinding chamber.

The central imperforate area preferably has a width of not less than 50% and not more than 80% of the transverse width of the grinding chamber. The grinding chamber is preferably of circular cross section and the central imperforate area thus has a diameter which is not less than 50% and not more than 80% of the diameter of the grinding chamber.

The horizontal baffle plate is provided to prevent the bed of particulate solid material from extending upwards to an undesirable degree near the walls of the grinding vessel. It was found that, if the height of the bed was not restricted, the particles of solid material in the region near the walls of the grinding vessel tended to be too widely spaced apart in the bed for effective grinding to take place. By providing the horizontal baffle plate the bed is effectively compressed in the region near the walls of the grinding vessel and the mean spacing between the particles is reduced so that more frequent collisions between particles occur and the efficiency of grinding is improved.

The width of the central opening of the horizontal baffle plate is preferably not less than 40% and not more than 70% of the transverse width of the grinding chamber. Most preferably the width of the central opening is about 40% to 45% of the transverse width of the grinding chamber.

The particulate solid material is preferably introduced into the grinding chamber at or near the central region of the grinding chamber, i.e. where the height of the bed of particulate solid material is least. This ensures that good mixing takes place between the material newly introduced into the grinding chamber and the material already in the bed.

If required the grinding chamber may be provided with an abrasion resistant lining which may be, for example, of a ceramic or elastomeric material.

The invention also concerns a process for dry grinding particulate solid material, wherein particulate solid material is introduced into a grinding chamber in which an impeller is rotated to agitate the particulate solid material and through which an upward flow of gas is passed at a velocity sufficient to elutriate comminuted particles from the grinding chamber, characterised in that the gas is introduced into the grinding chamber at a region away from the centre of the grinding chamber and exits the grinding chamber through a central opening in a horizontal baffle plate which is positioned in the grinding chamber at a height above the base of the grinding chamber which is not greater than one half of the transverse width of the grinding chamber.

Preferably the velocity of the upward flow of gas passing through the grinding chamber is not less than 0.1 cm.sec$^{-1}$ and not more than 250 cm.s$^{-1}$, and most preferably not less than 10 cm.s$^{-1}$ and not more than 150 cm.s$^{-1}$.

The peripheral or tip speed of the impeller is preferably not less than 5 m.s$^{-1}$ and not more than 20 m.sec$^{-1}$.

Advantageously water is mixed with the gas in the grinding chamber in proportions such that the relative humidity in the grinding chamber is maintained in the range from 40 to 80% RH. The water may be mixed with the gas in the grinding chamber or before the gas passes upwards through the perforated base into the grinding chamber. Preferably the water is sprayed or atomised into the gas to ensure good mixing. The relative humidity of the gas must be measured after substantially all solid particles have been separated therefrom, and a sensor which provides an electrical signal proportional to the relative humidity of the gas may be located downstream of a suitable gas/solid separating device, and the electrical signal used to control the quantity of water which is mixed with the gas. If desired, a surfactant may be mixed with the water, as in some cases this improves the efficiency of grinding.

The particulate solid material in the grinding chamber may be ground autogenously, i.e. by attrition between the particles of the solid material themselves. In this case the particles of the solid material are preferably not larger than about 30 mm.

Alternatively a particulate grinding medium comprising particles of a different material from the particulate material to be ground may be introduced into the grinding chamber. The particulate grinding medium preferably comprises particles of a hard material such as silica sand, aluminium silicate, e.g. mullite, alumina or zirconium silicate. The particles of the grinding medium preferably have sizes within the range from 150 microns to 10 mm. The weight ratio of particulate grinding medium to material to be ground may conveniently be not less than 2:1 and not more than 10:1. In the case in which a particulate grinding medium is used, the material to be ground preferably consists of particles not larger than about 2 mm.

The gas may be caused to flow upwardly through the grinding chamber at a velocity sufficient to elutriate comminuted particles from the grinding chamber either by compressing the gas before it passes through the perforated base or by applying reduced pressure to the upper part of the grinding chamber.

Advantageously the comminuted particles elutriated from the grinding chamber, together with the gas in which they are entrained, may be passed through a suitable dry particle classification device such as a cyclone or a rotor-type classifier. The particles which are insufficiently finely ground may be returned to the grinding chamber.

It may be advantageous to direct into the bed particles in the grinding chamber pulses of gas at a pressure which is higher than that of the gas flowing upwardly through the grinding chamber. These pulses help to minimise the formation of aggregates of finely ground particles. The pulses preferably have a duration of not less than 0.1 seconds and not more than 2 seconds and a frequency of one pulse per 1-120 seconds. The pressure of the injected gas is preferably not less than 14 KPa (2 psig) and not more than 140 KPa (20 psig).

It has been found that the grinding apparatus of this invention is particularly suited to surface treating inorganic materials. Thus, according to a further aspect of the present invention, there is provided a process for surface treating an inorganic material with a treating agent which will improve the performance of the inorganic material in an organic medium, the process comprising introducing the inorganic material together with the treating agent into a grinding chamber in which an impeller is rotated to agitate the particulate solid material and through which an upward flow of gas is passed at a velocity sufficient to elutriate comminuted particles from the grinding chamber, characterised in that the gas is introduced into the grinding chamber at a region away from the centre of the grinding chamber and exits the grinding chamber through a central opening in a horizontal baffle plate which is positioned in the grinding chamber at a height above the base of the grinding chamber which is not greater than half the transverse width of the grinding chamber.

The inorganic material may be, for example, kaolin, calcined kaolin, talc, mica, silica, calcium carbonate or gypsum, and the treating agent may be, for example, a higher fatty acid, i.e. a fatty acid having 12 or more carbon atoms, an amine or quaternary ammonium compound having at least one higher alkyl group, i.e. an alkyl group having from 10 to 24 carbon atoms, or a substituted silane. The quantity of the treating agent required is generally in the range from 0.1 to 5% by weight, based on the weight of dry inorganic material, but, by the process of the invention, it is found that from 0.1 to 1% by weight, based on the weight of dry inorganic material, usually gives optimum results. Where the treating agent is a quaternary ammonium compound, it may be added in solution in, for example, water, or in isopropyl alcohol or a mixture of the two.

The treating agent may be either added to, or mixed with, the inorganic material before it is introduced into the grinding chamber or alternatively introduced directly into the grinding chamber separately from the inorganic material to be treated.

The resultant surface treated material may be used as a reinforcing filler in a rubber or plastics composition where it has been found to give improved properties to articles formed therefrom. The surface treated material would be particularly suitable for incorporation in plasticised and unplasticised PVC compositions, in polypropylene compositions and in silicone and polysulphide sealing compositions.

For a better understanding of the present invention and to show how it may be carried into effect, reference will now be made, by way of example, to the accompanying drawings in which.

Figure 1:
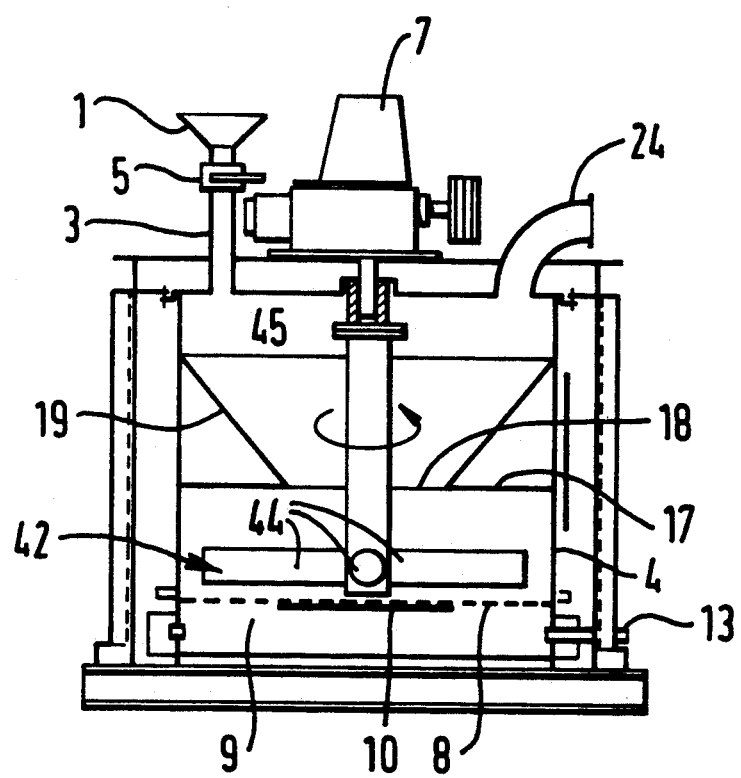
FIG. 1 shows a section through grinding apparatus.

In the apparatus of FIG. 1, particulate solid material to be ground is introduced from a feed hopper 1 through a rotary valve 5 and a feed inlet 3 into a grinding chamber 4. The bottom of the grinding chamber is formed by a perforated base plate 8 having a central imperforate area 10. Below the perforated base plate 8 is a plenum chamber 9 into which air is admitted under pressure through a conduit 13.

The particulate solid material in the grinding chamber is agitated by means of an impeller 42, which comprises four round bars 44 disposed in the arrangement of a cross and rigidly secured to a shaft 45 which is rotated by means of an electric motor (not shown) driving through a gearbox 7.

The gas together with entrained finely ground particles leaves the grinding chamber through an outlet 24.

The grinding chamber is of circular cross section of diameter 1.000 m and the height of the grinding chamber from the perforated base plate 8 to the top is 863 mm.

The central portion 10 of the perforated base plate 8 is rendered imperforate so that the gas is forced to pass upwards through the bed of particulate solid material in an annular region near the walls of the grinding chamber 4. The diameter of the central imperforate portion 10 of the perforated base plate 8 is 600 mm or 60% of the diameter of the grinding chamber.

A horizontal baffle plate 17, with a central circular opening 18, is located at a height of 330 mm, i.e. 33% of the diameter of the grinding chamber, above the perforated base plate 8. A frusto-conical funnel 19 is provided above the baffle plate to guide the incoming feed material into the central part of the bed of particulate solid material. The diameter of the central circular opening is 410 mm, i.e. 41% of the diameter of the grinding chamber.

Figure 2:
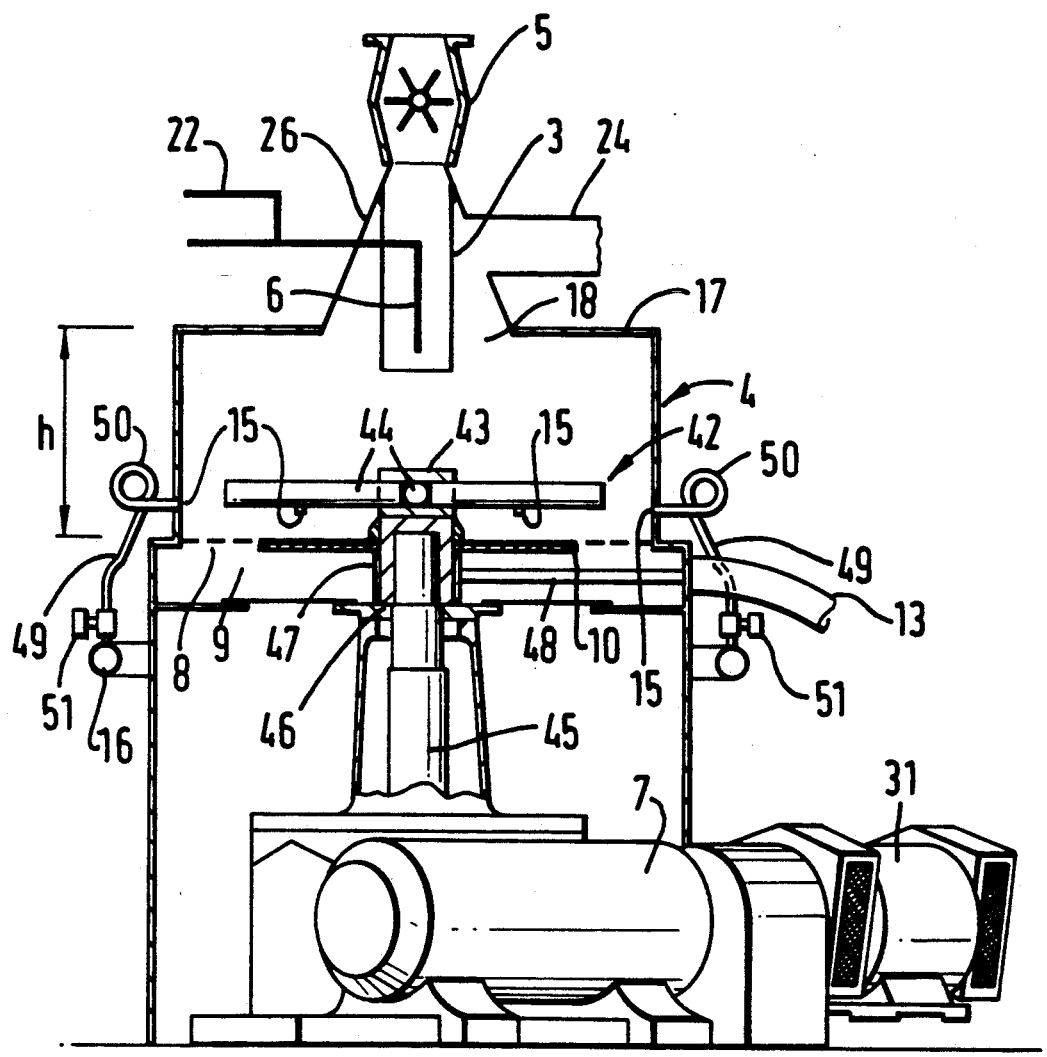
FIG. 2 is a diagrammatic representation, partly in section, of a second embodiment of grinding apparatus.

FIG. 2 shows another embodiment of dry grinding apparatus in accordance with the invention. Particulate solid material to be ground is introduced through a rotary valve 5 and a feed inlet 3 into a cylindrical grinding chamber 4 which has a perforated base plate 8, the central portion 10 of which is imperforate. The diameter of the imperforate area is 60% of the diameter of the grinding chamber. Gas under pressure is admitted through a conduit 13 into a plenum chamber 9 below the perforated base plate 8 and travels upwards through the holes in the base plate, substantially within an annular region near the walls of the grinding chamber.

The particulate solid material in the grinding chamber is agitated by means of an impeller 42, which comprises a boss 43 into which are screwed four round bars 44, disposed in the arrangement of a cross. The boss 43 is rigidly secured to a shaft 45 which is rotated from below by means of an electric motor 31 driving through a gearbox 7. The shaft 45 is supported in a bearing 46 and rotates with some clearance within a sleeve 47, to which clearance gas under pressure is admitted through a conduit 48, from the stream of gas entering the plenum chamber 9 through the conduit 13.

The top plate 17 of the grinding chamber 4 is at a height h, which is equal to 33% of the diameter of the grinding chamber, above the perforated base plate 8. The top plate 17 has a central circular opening 18 which communicates with a frusto-conical chamber 26 which surrounds, and is coaxial with, the feed inlet 3. An outlet 24 of the gas together with entrained finely ground particles is provided in one side of the frusto-conical chamber 26. The diameter of the circular opening 18 is 41% of the diameter of the grinding chamber. The top plate 17 acts as a horizontal baffle to prevent the bed of particulate solid material expanding in the region near the walls of the grinding chamber to the height which it would reach under the influence of the gas passing upwards through the perforated base plate 8 in the absence of any constraint. The particles in the bed are thus compressed relatively closely together and the efficiency of grinding is improved.

Water may be introduced into the grinding chamber through a conduit 6 which discharges near the lower end of the feed inlet 3. If desired a surfactant may be supplied through a conduit 22 and mixed with the water.

Figure 3:
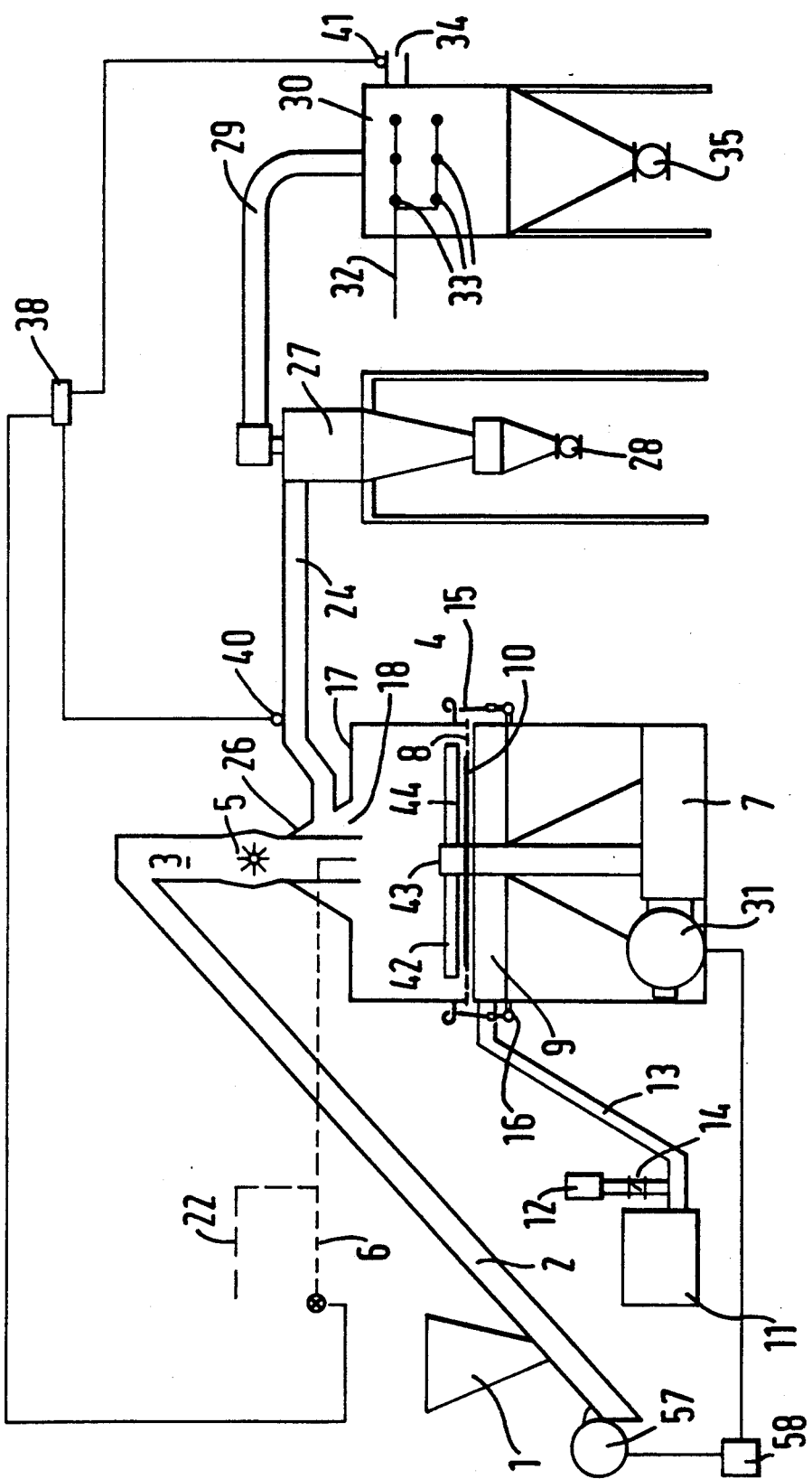
FIG. 3 is a diagram of the general arrangement of a grinding plant incorporating the grinding apparatus of FIG. 2.

FIG. 3 shows the general arrangement of a grinding plant incorporating apparatus in accordance with the invention. Particulate solid material to be ground is charged into a feed hopper 1 whence it is conveyed by means of a belt conveyor 2 to the feed inlet 3 of a grinding chamber 4, which it enters through a rotary valve 5. Compressed air is supplied to a plenum chamber 9 by means of a fan 11 through a conduit 13 and enters the grinding chamber 4 through a perforated plate 8 which has a central imperforate area 10, the diameter of which is 60% of the diameter of the grinding chamber.

A vent 12, the flow through which is controlled by a valve 14, regulates the supply of compressed air to the plenum chamber 9.

An impeller 42 comprising four circular section bars 44 screwed into a boss 44 is rotated in the lower part of the grinding chamber 4, immediately above the perforated plate 8, by means of an electric motor 31 driving through a gearbox 7. The belt conveyor 2 is driven by an electric motor which is started and stopped according to the current drawn by the electric motor 31. As the load in the grinding chamber 4 increases according to the nature of the material to be ground, the current drawn by the motor 31 may either rise or fall and, for most efficient grinding, it has been found to be desirable to regulate the supply of particulate solid material to the grinding chamber so that the motor 31 runs at nearly its full load. An electric signal proportional to the current drawn by the motor 31 is supplied to a controller 58 which starts or stops the motor 57 when the current drawn by the motor 31 rises to the desired maximum value and reveres the state of the motor 31 when the current falls to a predetermined lower value.

A top plate 17 for the grinding chamber 4 is provided at a height above the perforated plate 8 which is equal to 33% of the diameter of the grinding chamber. A central circular opening 18 of diameter equal to 41% of the diameter of the grinding chamber is provided in the top plate 17 and communicates with a frusto-conical chamber 26 from the side of which a conduit 24 leads to a cyclone 27 wherein the major part of the solid particles are separated from the gas and may be discharged through a rotary valve 28. Gas, which still contains some entrained fine particles, passes from the top of the cyclone 27 through a conduit 29 to a bag filter 30 where the remaining finely divided material is separated from the air. Pulses of high pressure air are supplied through a conduit 32 to a plurality of inlets 33 communicating with the interior of the filter stockings (not shown) in the bag filter to flow accumulated solid material off the outer surface of the filter stockings. The solid material falls to the base of the bag filter assembly where it is discharged through a rotary valve 35.

Substantially clean air leaves the bag filter through an outlet 34. A humidity sensor 41 is located in the outlet 34 and feeds an electrical signal proportional to the relative humidity to a controller 38. A temperature sensor 40 is located in the conduit 24 and feeds an electric signal proportional to the temperature of the gas and entrained solid material therein to the controller 38. The controller 38 provides a signal to a solenoid-operated valve 39 which controls the rate of supply of water through a conduit 6. If required a surfactant may be mixed with the water to the grinding chamber through a conduit 22.

If desired pulses of air, at a pressure higher than that flowing upwards through the grinding chamber, may be injected into the grinding chamber through inlets 15 and from a manifold 16.

When the above described apparatus is to be used for the surface treating of an inorganic material, the treating agent (whether liquid or solid) may be premixed with the inorganic material before it is introduced into the grinding chamber. Alternatively, it may be added directly to the grinding chamber or to the inorganic material before it enters the grinding chamber, for instance at the feed hopper 1 or on the conveyor 2. If the treating agent is liquid, it may be introduced directly into the grinding chamber, separately from the inorganic material to be treated.

In the embodiment illustrated in FIGS. 2 and 3, the material alone is introduced from the feed hopper 1 and the treating agent is supplied in liquid form through a conduit 22 which discharges into the grinding chamber near the lower end of the feed inlet 3.

Water may be introduced into the grinding chamber through a conduit 6 which discharges near the lower end of the feed inlet 3. The treating agent may be mixed with the water before being supplied to the grinding chamber. In a dry attrition grinding process, water acts as both a cooling agent and as a grinding aid. Separate addition of water is not usually necessary when treating agent is added, because the treating agent itself lubricates the surface of the particles of the inorganic material to be treated. However, it may be desirable to add water with the treating agent to provide a more dilute solution or suspension of the treating agent to enable the treating agent to be metered more accurately.

The invention will now be exemplified by reference to the following examples.

EXAMPLE 1

Batches of marble which had been comminuted to a particle size distribution such that substantially all of the particles passed through a No. 300 mesh British Standard sieve (nominal aperture 53 microns) were supplied to two different dry grinding devices, one being as disclosed in GB-A-2190016 and the other being as illustrated in FIG. 2. In each case there was also supplied to the grinding chamber, as a grinding medium, particles of Ottawa sand having sizes ranging from 0.5 mm to 1.0 mm in an amount such that the weight ratio of dry sand to dry marble was 6:1.

In each case the impeller 42 was rotated at 200 rpm which gives an impeller speed of 9 m.sec$^{-1}$ and air was introduced into the plenum chamber 9 at a suitable volumetric flow rate. In the case of the prior art device disclosed in GB-A-2190016 it was not possible to introduce air at a flow rate greater than 5 m$^3$min$^{-1}$, because flow rates greater than this level caused unground feed particles to be elutriated from the grinding chamber. In the case of the device illustrated in FIG. 2 it was possible to operate at flow rates up to 15 m$^3$min$^{-1}$.

In each case the grinding of the marble was conducted under conditions which previous experience had shown would yield a product having a particle size distribution such that from 20% to 30% by weight of the product consisted of particles having an equivalent spherical diameter smaller than 2 microns. The energy consumed by the motors driving the impeller 32 and the fan 11 supplying compressed air to the plenum chamber 9 during the grinding was measured in each case by means of a kilowatt hour meter and the energy consumed per tonne of dry marble ground was calculated. The percentage by weight of particles having equivalent spherical diameters larger than 10 microns and smaller than 2 microns respectively were measured for the feed material and for each ground product.

The results are set forth in Table I below:

TABLE I

| Type of device | Air flow rate (m$^3$ min$^{-1}$) | Air velocity (cm sec$^{-1}$) | Energy consumed (KWh tonne$^{-1}$) | by weight of particles larger than 10 microns | by weight of particles smaller than 2 microns |
|---|---|---|---|---|---|
| Feed | — | — | — | 75 | 7 |
| Prior Art | 5 | 10.6 | 344 | 55 | 26 |
| FIG. 2 | 8 | 117.0 | 151 | 41 | 22 |

EXAMPLE 2

Batches of marble which had been crushed and passed through a screen of aperture size 12 mm were supplied to two different grinding devices one being as disclosed in GB-A-2190016 and the other being as illustrated in FIG. 2.

In each case the impeller was rotated at 200 rpm (impeller tip speed 9 m.sec$^{-1}$) and air was introduced into the plenum chamber 9 at a volumetric flow rate of 8 m$^3$min$^{-1}$. The grinding of the marble was conducted in each case under conditions such as to yield a product having a particle size distribution such that from 30 to 35% by weight of the product consisted of particles having an equivalent spherical diameter smaller than 2 microns.

No additional grinding medium was used in this case but the marble particles were ground autogenously.

The energy consumed by the electric motors driving the impeller 32 and the fan 11 during the grinding was measured in each case and the energy consumed per tonne of dry marble was calculated. The percentages by weight of particles retained on a No. 300 mesh British Standard sieve (nominal aperture 53 microns) and having an equivalent spherical diameter larger than 10 microns and smaller than 2 microns respectively were measured for each ground product.

The results are set forth in Table II below:

TABLE II

| Type of device | Energy consumed (kWh tonne$^{-1}$) | % by weight of particles larger than 53 microns | larger than 10 microns | smaller than 2 microns |
|---|---|---|---|---|
| Prior art | 680 | 7 | 46 | 35 |
| FIG. 2 | 187 | 3 | 41 | 31 |

It can be seen that a device in accordance with the invention, as illustrated in FIG. 2, is capable of producing ground marble having the desired particle size distribution with a smaller energy consumption than is required if a device in accordance with the prior art is used.

EXAMPLE 3

50 kg of ground natural chalk having a particle size distribution such that 15% by weight consisted of particles having an equivalent spherical diameter larger than 10 μm and 35% by weight consisted of particles having an equivalent spherical diameter smaller than 2 μm was mixed with 0.125 Kg (0.25% by weight, based on the weight of dry chalk) of "PRISTERENE 4903" stearic acid ("PRISTERENE" is a trade mark of Unichema International) by means of a low speed stirrer. This mixture was then mixed with 250 Kg of Ottawa sand having particles in the size range −16 mesh +30 mesh British Standard Sieve (0.5 mm to 1.0 mm). The resultant mixture of chalk, stearic acid and sand, with sand and chalk in a 5:1 weight ratio, was fed to a dry grinding mill of the type described above. The impeller was rotated at 200 rpm which gives an impeller tip speed of about 9 m.sec$^{-1}$ and air was introduced into the plenum chamber at a volumetric flow rate of 5 m$^3$.min$^{-1}$. The electric current drawn by the motor driving the impeller was continuously monitored. As the well lubricated, stearic acid coated particles were elutriated from the bed, the current rose. It is postulated that this is because the removal of well lubricated fine particles by elutriation caused an increase in bed "viscosity". Thus, a rise in current was considered to indicate that a significant proportion of the finely ground chalk particles had been elutriated out of the grinding chamber. Therefore, more of the feed mixture was automatically drawn into the grinding chamber until the current returned to its normal operating level. The grinding was continued for a period of about 6 hours, but, because the system requires a significant time in order to reach equilibrium, samples of the product were collected for further testing only in the last 3 hours of the grinding run. The ground, surface coated chalk particles were separated from the elutriating air by means of a cyclone and a bag filter and were then passed through a sieve of aperture size 0.5 mm in order to separate from the coated chalk any particles of sand which had also been elutriated out of the grinding chamber.

The experiment was then repeated four further times but with quantities of stearic acid of 0.5%, 1.0%, 1.5% and 2.0%, respectively, based on the weight of dry chalk. In each case, samples of the finely ground chalk, uniformly coated with stearic acid, were collected for further testing during the last 3 hours of the grinding run.

In each case the product was tested for the percentage of particles having equivalent spherical diameters larger than 10 μm and smaller than 2 μm, respectively, and the results are set forth in Table III below:

TABLE III

| % by weight stearic acid | Proportion by weight | |
|---|---|---|
| | larger than 10 μm | smaller than 2 μm |
| 0.25 | 2.2 | 67.0 |
| 0.5 | 3.2 | 53.8 |
| 1.0 | 2.0 | 63.5 |
| 1.5 | 1.4 | 68.9 |
| 2.0 | 5.8 | 54.1 |

Samples of the finely ground chalk, coated with the different amounts of stearic acid, were incorporated into plasticised PVC compositions having the following formulation:

| | Parts by weight |
|---|---|
| PVC - CORVIC S71/105 | 100 |
| Plasticiser - Di-2-ethyl octylphthalate | 55 |
| Stabiliser - Tribasic lead sulphate | 5 |
| Filler - Stearic acid coated chalk | 100 |

"CORVIC" is a Registered Trade Mark of Imperial Chemical Industries plc.

The ingredients were first mixed by hand using a spatula and pot, the plasticiser being added last. The mix was then fed between the rolls of a twin roll steam heated mill. When the polymer was completely melted and the ingredients uniformly mixed, with the composition evenly distributed over one of the rolls, the composition was removed from the roll and allowed to cool to room temperature. The plastics sheet was then guillotined into roughly square pieces of width 25-40 mm. The square pieces were then fed to a four bladed granulating mill provided with a screen of aperture size 6-7 mm. The resultant granules were fed to an injection moulding press which was fitted with a tree mould which produced, for each composition, a disc of diameter 90-100 mm and thickness 3 mm, a flat dumb-bell-shaped test piece, and bars of the standard dimensions required for the determination of flexural modulus and flexural yield.

As a control, test pieces were also prepared from a plasticised PVC composition which contained, as the filler, a commercial surface treated calcium carbonate product known as "POLCARB S" ("POLCARB" is a Registered Trade Mark of ECC International Ltd.), which had a particle size distribution such that 0.6% by weight consisted of particles having an equivalent spherical diameter larger than 10 μm and 89.9% by weight consisted of particles having an equivalent spherical diameter smaller than 2 μm. This calcium carbonate product had been treated with 1% by weight, based on the weight of dry calcium carbonate, of stearic acid in a heated impact mill.

In each case the dumb-bell-shaped test piece was tested for tensile strength and elongation at break of the composition by the method prescribed in British Standard Specification 2782: Part III: Method 320 and the 90-100 mm diameter disc was tested for volume electrical resistivity by means of a Megaohmmeter. The disc was placed in a test cell between aluminium electrodes which were loaded together by means of a small hydraulic press at a pressure of 0.4 MPa. The electrodes were connected to a 500 V DC supply, and the volume resistivity was measured at temperatures of 16° C. and 60° C., respectively. The colour of each of the compositions, expressed as "δE" was measured, using the disc as a test piece, by a system which is based on the formula known as the C.I.E. 1976 L* a* b* formula which was developed by the Commission Internationale d'Eclairage. Three measurements of the intensity of light reflected from the surface of the sample were made using Tristimulus X, Y and Z filters, which each embrace a broad band of wavelengths in the visible spectrum but are generally red, green and blue in colour, respectively. The measurements were made by means of an Elrepho photometer and L*, a* and b* values were calculated from the reflectance values for the X, Y and Z filters according to the formulae:

$$L^* = 10\sqrt{Y},$$

$$a^* = \frac{17.5}{\sqrt{Y}}(1.02X - Y),$$

$$b^* = \frac{7.0}{\sqrt{Y}}(Y - 0.8467Z)$$

The a* and b* values can be said to be co-ordinates representing chromaticity(i.e. "redness", "yellowness" etc.) and the L* value can be said to represent the lightness or darkness of the shade. Of special interest is the difference in colour of the sample of the filled polymer composition from pure white (L*=100, a*=b*=0), and for this purpose there is calculated a colour difference δE which is given by:

$$\delta E=[(\delta L^*)^2+(\delta a^*)^2+(\delta b^*)^2]^{\frac{1}{2}}$$

where δL*, δa* and δb* represent the difference in the L*, a* and b* values of the sample from those of a pure white surface.

The results are set forth in Table IV below:

TABLE IV

| % by wt. stearic acid | Tensile strength (MPa) | Elongation at break (%) |
|---|---|---|
| Control | 13.7 | 110.2 |
| 0.25% | 15.8 | 84.3 |
| 0.5% | 16.2 | 78.1 |
| 1.0% | 16.0 | 74.3 |
| 1.5% | 15.3 | 81.0 |
| 2.0% | 14.8 | 87.5 |

| % by wt. stearic acid | Volume resistivity (Ω.cm-1) | | Color (δE) |
|---|---|---|---|
| | (16 oC) | (60 oC) | |
| Control | 2.55 × 10¹⁴ | 0.56 × 10¹³ | 29.7 |
| 0.25% | 3.50 × 10¹⁴ | 1.28 × 10¹³ | 28.7 |
| 0.5% | 3.30 × 10¹⁴ | 1.40 × 10¹³ | 27.5 |
| 1.0% | 3.10 × 10¹⁴ | 1.21 × 10¹³ | 29.6 |
| 1.5% | 3.48 × 10¹⁴ | 0.90 × 10¹³ | 31.2 |
| 2.0% | 3.56 × 10¹⁴ | 0.81 × 10¹³ | 36.2 |

EXAMPLE 4

Samples of the five batches of surface treated calcium carbonate prepared according to the invention, in the manner described in Example 3, and a further sample of the commercial surface treated calcium carbonate, were incorporated into unplasticised PVC compositions having the following formulation:

| | Parts by weight |
|---|---|
| PVC - CORVIC S71/105 | 100 |
| Stabiliser/lubricant - BQ3301 | 6 |
| Processing aid - PARALOID K125 | 2 |
| Filler | 30 |

For each composition, injection moulded test pieces in the form of a dumb-bell, a disc and standard test bars were prepared as described in Example 3. The test pieces were used for determinations of tensile strength and elongation at break and also of flexural modulus and flexural yield by the method prescribed in British Standard Specification 2782: Part III: Method 335A. The colour or "δE" of each composition was also determined. Samples were also tested for falling weight impact strength by means of a Yarsley falling weight impact tester in which a 5 Kg weight having a 20 mm hemispherical tup was allowed to fall through a height of 820 mm on to the disc of diameter 90-100 mm supported on a ring of internal diameter 40 mm. A transducer mounted in the tup monitored the force exerted by the tup on the centre of the PVC disc with time after contact and the energy absorbed before rupture occurred was calculated.

The results are set forth in Table V below:

TABLE V

| % by weight stearic acid | Tensile strength (MPa) | Elongation at break (%) | Flexural modulus (MPa) |
|---|---|---|---|
| Control | 44.9 | 43.3 | 1998 |
| 0.25% | 42.3 | 41.5 | 2047 |
| 0.5% | 45.5 | 51.4 | 2047 |
| 1.0% | 45.9 | 71.7 | 2150 |
| 1.5% | 45.7 | 53.6 | 1931 |
| 2.0% | 45.6 | 45.2 | 1984 |

| % by weight stearic acid | Flexural yield (MPa) | Impact energy (J) | Color (δE) |
|---|---|---|---|
| Control | 70.5 | 0.220 | 21.8 |
| 0.25% | 67.0 | 0.237 | 22.6 |
| 0.5% | 69.8 | 0.182 | 22.5 |
| 1.0% | 68.6 | 0.198 | 22.0 |
| 1.5% | 68.0 | 0.223 | 23.2 |
| 2.0% | 69.6 | 0.182 | 25.9 |

EXAMPLE 5

Samples of the five batches of surface treated calcium carbonate prepared by the process of the invention as described in Example 3, together with a further sample of the commercial surface treated calcium carbonate, were incorporated into polypropylene compositions having the following formulation:

| | Parts by weight |
|---|---|
| Polypropylene "PROPATHENE" GWM22 | 100 |
| Filler | 100 |

"PROPATHENE" is a Registered Trade Mark of Imperial Chemical Industries plc.

Test pieces were prepared from each composition by the method described in Example 3, except that the ingredients were not mixed by hand before being fed to the steam heated twin roll mill. Instead, the polypropylene alone was fed first to the twin roll mill, and, when the polymer was fully melted, the filler was then added. The same tests were performed as are described in Example 4 above, and the results are set forth in Table VI below:

TABLE VI

| % by weight stearic acid | Tensile strength (MPa) | Elongation at break (%) | Flexural modulus (MPa) |
|---|---|---|---|
| Control | 26.2 | 32.3 | 1358 |
| 0.25% | 28.2 | 23.7 | 1385 |
| 0.5% | 27.9 | 40.3 | 1314 |
| 1.0% | 26.3 | 39.8 | 1270 |
| 1.5% | 26.1 | 30.0 | 1216 |
| 2.0% | 25.4 | 25.3 | 1163 |

| % by weight stearic acid | Flexural yield (MPa) | Impact energy (J) | Color (δE) |
|---|---|---|---|
| Control | 37.2 | 0.216 | 24.3 |
| 0.25% | 37.2 | 0.296 | 23.7 |
| 0.5% | 38.2 | 0.254 | 27.5 |
| 1.0% | 36.5 | 0.298 | 23.9 |
| 1.5% | 35.1 | 0.258 | 21.9 |
| 2.0% | 34.5 | 0.191 | 24.6 |

I claim:

1. Apparatus for dry grinding particulate solid material, which apparatus comprises a grinding chamber, means for introducing particulate solid material into the grinding chamber, a perforated base of the grinding chamber through which gas is introduced to provide an upflow of gas passing through the particulate solid material and an impeller rotating in the grinding chamber to agitate the particulate solid material contained therein, the perforated base having a central imperforate area which causes the gas to pass preferentially through the region near the walls of the grinding chamber, and a horizontal baffle plate having a central opening, the baffle plate being positioned in the grinding chamber at a height above the perforated base which is not greater than one half of the transverse width of the grinding chamber.

2. Apparatus as claimed in claim 1, in which the grinding chamber is of circular cross section.

3. Apparatus as claimed in claim 1, in which the central imperforate area has a width which is not less than 50% and not more than 80% of the transverse width of the grinding chamber.

4. Apparatus as claimed in claim 1, in which the width of the central opening of the horizontal baffle plate is not less than 40% and not more than 70% of the transverse width of the grinding chamber.

5. Apparatus as claimed in claim 1, in which the width of the central opening of the horizontal baffle plate is approximately 40% to 45% of the transverse width of the grinding chamber.

6. Apparatus as claimed in claim 1, in which the particulate solid material is introduced into the grinding chamber at or near the central region of the grinding chamber.

7. Apparatus as claimed in claim 1, in which the grinding chamber is provided with an abrasion resistant lining which may be, for example, of a ceramic or elastomeric material.

8. A process for dry grinding particulate solid material, in which particulate solid material is introduced into a grinding chamber in which an impeller is rotated to agitate the particulate solid material and through which an upward flow of gas is passed at a velocity sufficient to elutriate comminuted particles from the grinding chamber, characterised in that the gas is introduced into the grinding chamber at a region away from the centre of the grinding chamber and exits the grinding chamber through a central opening in a horizontal baffle plate which is positioned in the grinding chamber at a height above the base of the grinding chamber which is not greater than half the transverse width of the grinding chamber.

9. A process as claimed in claim 8, in which the velocity of the upward flow of gas passing through the grinding chamber is not less than 0.1 cms$^{-1}$ and not more than 250 cms$^{-1}$.

10. A process as claimed in claim 8, in which the velocity of the upward flow of gas passing through the grinding chamber is not less than 10 cms$^{-1}$ and not more than 150 cms$^{-1}$.

11. A process as claimed in claim 8, in which the peripheral or tip speed of the impeller is not less than 5 ms$^{-1}$ and not more than 20 ms$^{-1}$.

12. A process as claimed in claim 8, in which water is mixed with the gas in the grinding chamber in proportions such that the relative humidity in the grinding chamber is maintained at not less than 40% and not more than 80% relative humidity.

13. A process as claimed in claim 12, in which the water is mixed with the gas in the grinding chamber.

14. A process as claimed in claim 12, in which the water is mixed with the gas before the gas passes upwards through the perforated base into the grinding chamber.

15. A process as claimed in claim 12, in which the water is sprayed or atomised into the gas to ensure good mixing.

16. A process as claimed in claim 12, in which a sensor is provided which produces an electrical signal proportional to the relative humidity of the gas and is located downstream of a suitable gas solid separating device, the electrical signal produced by the sensor being used to control the quantity of water which is mixed with the gas.

17. A process as claimed in claim 12, in which a temperature sensor is provided which produces an electrical signal proportional to the temperature of the material in the grinding chamber or the temperature of the gas and entrained solid material leaving the grinding chamber, the electrical signal produced by the sensor being used to control the quantity of water which is mixed with the gas.

18. A process as claimed in claim 12, in which a surfactant is mixed with the water.

19. A process as claimed in claim 8, in which the particulate solid material in the grinding chamber is ground autogenously.

20. A process as claimed in claim 8, in which the particles of the solid material are preferably not larger than about 30 mm.

21. A process as claimed in claim 8, in which a particulate grinding medium comprising particles of a different material from the particulate material to be ground is introduced into the grinding chamber.

22. A process as claimed in claim 21, in which the particulate grinding medium comprises particles of a hard material such as silica sand, aluminium silicate, e.g. mullite, alumina or zirconium silicate.

23. A process as claimed in claim 21, in which the sizes of the particles of the grinding medium are not less than 150 microns and not more than 10 mm.

24. A process as claimed in claim 21, in which the weight ratio of particulate grinding medium to material to be ground is not less than 2:1 and not more than 10:1.

25. A process as claimed in claim 21, in which the material to be ground consists of particles not larger than about 2 mm.

26. A process as claimed in claim 8, in which the gas is caused to flow upwardly through the grinding chamber at a velocity sufficient to elutriate comminuted particles from the grinding chamber.

27. A process as claimed in claim 26, in which the upward flow of gas is produced by compressing the gas before it passes through the perforated base.

28. A process as claimed in claim 26, in which the upward flow of gas is caused by applying reduced pressure to the upper part of the grinding chamber.

29. A process as claimed in claim 26, in which the comminuted particles elutriated from the grinding chamber, together with the gas in which they are entrained, is passed through a suitable dry particle classification device such as a cyclone or a rotor.

30. A process as claimed in claim 8, in which the particles which are insufficiently finely ground are returned to the grinding chamber.

31. A process as claimed in claim 8, in which pulses of gas at a pressure which is higher than that of the gas flowing upwardly through the grinding chamber are directed into the bed of particles in the grinding chamber.

32. A process as claimed in claim 31, in which the pulses of gas have a duration of not less than 0.1 seconds and not more than 2 seconds.

33. A process as claimed in claim 31, in which the pressure of the pulses of gas are not less than 14 KPa and not more than 140 KPa.

34. A process as claimed in claim 31, in which the pulses of gas have a frequency of one pulse per 1–120 seconds.

35. A process as claimed in claim 8, for surface treating an inorganic material with a treating agent which will improve the performance of the inorganic material in an organic medium, including the step of introducing the inorganic material together with the treating agent into the grinding chamber.

36. A process for surface treating an inorganic material with a treating agent which will improve the performance of the inorganic material in an organic medium, the process comprising dry grinding the inorganic material with the treating agent in the grinding chamber of an apparatus, which apparatus comprises a grinding chamber, means for introducing particulate solid material into the grinding chamber, a perforated base of the grinding chamber through which gas is introduced to provide an upflow of gas passing through the particulate solid material and an impeller rotating in the grinding chamber to agitate the particulate solid material contained therein, the perforated base having a central imperforate area which causes the gas to pass preferentially through the region near the walls of the grinding chamber, and a horizontal baffle plate having a central opening, the baffle plate being positioned in the grinding chamber at a height above the perforated base which is not greater than one half of the transverse width of the grinding chamber.

37. A process as claimed in claim 35 or 36, in which the quantity of treating agent used is in the range 0.1 to 5% by weight, based on the weight of dry inorganic material.

38. A process as claimed in claim 35 or 36, in which the quantity of treating agent used is in the range from 0.1 to 1% by weight, based on the weight of dry inorganic material.

39. A surface treated inorganic material prepared by a process as claimed in claim 35 or 36.

40. A rubber or plastics composition including, as a filler, a surface treated inorganic material as claimed in claim 39.

* * * * *